United States Patent
Van Leeuwen et al.

(10) Patent No.: US 6,920,801 B2
(45) Date of Patent: Jul. 26, 2005

(54) MEASUREMENT DEVICE FOR MEASURING RADIAL AND/OR AXIAL FORCES

(75) Inventors: Bernardus Gerardus Van Leeuwen, Nieuwegein (NL); Eduardus Gerardus Maria Holweg, Delft (NL); Frank Wit, Nieuwegein (NL); Erik Zaaijer, Nieuwegein (NL); Simon Ballegooij, Wijk Bij Duurstede (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 91 days.

(21) Appl. No.: 10/432,901

(22) PCT Filed: Nov. 30, 2001

(86) PCT No.: PCT/NL01/00871

§ 371 (c)(1),
(2), (4) Date: Jun. 23, 2003

(87) PCT Pub. No.: WO02/44678

PCT Pub. Date: Jun. 6, 2002

(65) Prior Publication Data

US 2004/0261543 A1 Dec. 30, 2004

(30) Foreign Application Priority Data

Nov. 30, 2000 (NL) .............................................. 1016756

(51) Int. Cl.[7] ................................................ G01L 5/12
(52) U.S. Cl. .................................................. 73/862.49
(58) Field of Search ..................... 73/862.392, 862.393, 73/862.49, 862.391

(56) References Cited

U.S. PATENT DOCUMENTS

| | | | |
|---|---|---|---|
| 4,095,852 A | * 6/1978 | Schutz | .......................... 384/2 |
| 4,112,751 A | 9/1978 | Grunbaum | |
| 5,159,841 A | 11/1992 | Montalvo, III et al. | |
| 5,221,146 A | 6/1993 | Maruyama | |
| 5,399,027 A | * 3/1995 | Ijuin et al. | .................. 384/475 |
| 5,952,587 A | 9/1999 | Rhodes et al. | |
| 6,109,793 A | * 8/2000 | Miyazaki | ..................... 384/448 |
| 6,227,710 B1 | * 5/2001 | Message et al. | ............. 384/448 |
| 6,286,374 B1 | * 9/2001 | Kudo et al. | ............... 73/862.59 |

* cited by examiner

*Primary Examiner*—Max Noori
(74) *Attorney, Agent, or Firm*—Oliff & Berridge, PLC

(57) ABSTRACT

Measurement device (1) for measuring the axial and/or radial load on a bearing (10) comprising an inner ring (11), an outer ring (12) and a plurality of rolling elements (13) between the inner and outer ring. The measurement device (1) comprises a sensor ring (3) which may be positioned adjacent to and in close contact with the inner ring (11) or outer ring (12) of the bearing (10), the sensor ring (3) having at least one weakening (2) at its circumference and at least one sensor (5) being positioned in the at least one weakening (2).

9 Claims, 3 Drawing Sheets

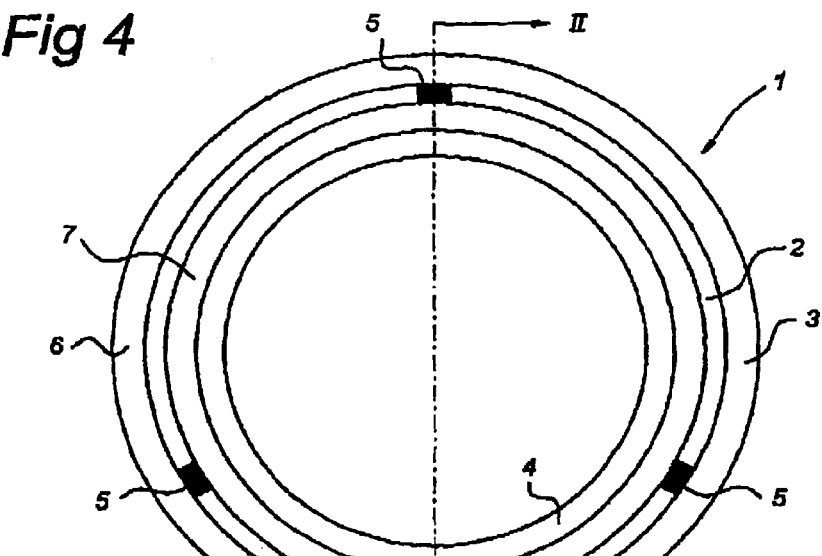
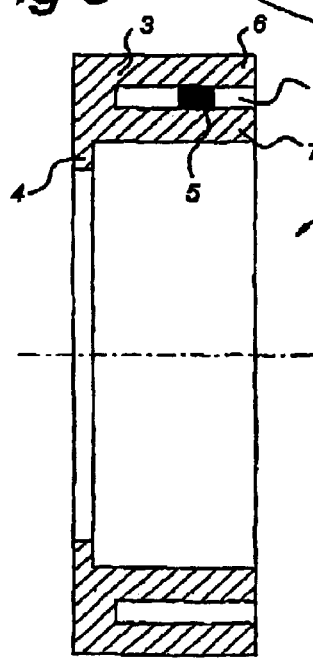
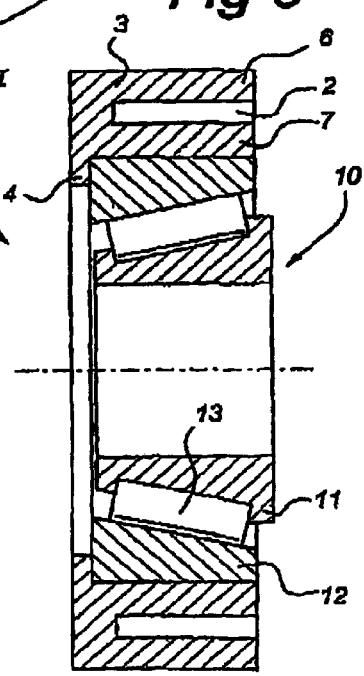

MEASUREMENT DEVICE FOR MEASURING RADIAL AND/OR AXIAL FORCES

The term "This Application is a 371 of PCT/NL01/00871 Nov. 30, 2001.

The present invention relates to a measurement device for measuring the axial and/or radial load on a bearing comprising an inner ring, an outer ring and a plurality of rolling elements between the inner and outer ring.

American patent U.S. Pat. No. 4,203,319 describes an apparatus for measuring external forces in a roller bearing, provided with at least two strain gauges for measuring the force applied on the bearing. By separately recording, amplifying and rectifying the signals from the two strain gauges, and by subtracting the two signals, a signal proportional to the external force is obtained, free from distortion of the signal by internal forces. Axial and radial fores on a shaft supported by a set of two conical roller bearings may be measured by a further embodiment described in this document. Apart from the two strain gauges in one of the bearings as in the described apparatus, an additional stain gauge is applied to the second bearing. The radial force on the shaft is measured using the two strain gauges on the first roller bearing, while the axial force on the shaft is measured using two strain gauges on separate roller bearings.

American patent U.S. Pat. No. 4,341,122 describes a force measuring device for simultaneously measuring radial and axial forces on a roller bearing, using at least three strain gauges on the bearing. Two strain gauges are positioned opposite one another on a first row of roller bearings and one strain gauge is positioned on a second row of roller bearings. The device further comprises a correction arrangement for eliminating signal distortion due to apparent axial forces.

The known apparatus and device have a disadvantage, in that they use resistive stain gauges to measure the strain in the outer ring of the roller bearing. However, these arrangements and type of measurement sensor are very temperature dependent and the arrangement requires a lot of electronics to detect a change in resistance.

The present invention seeks to provide a measurement device and a measurement system for differential load sensing of radial and axial load on a bearing, not having the disadvantages described above.

According to the present invention, a measurement device according to the preamble defined above is provided, in which the measurement device comprises a sensor ring which may be positioned adjacent to and in close contact with the inner ring or outer ring of the bearing, the sensor ring having at least one weakening at its circumference and at least one sensor being positioned in the at least one weakening. The at least one sensor is e.g. a displacement sensor or a load sensor.

A radial load applied on a bearing is distributed over a number of the plurality of rolling elements of the bearing. Depending on the bearing type, and amount of load, the radial load is distributed over a few to substantially half of the plurality of the rolling elements. When a bearing is rotating in operation, the passing rolling elements cause a local compression of the raceway of the inner or outer bearing ring, resulting in a displacement. This displacement is effectively transmitted to the sensor ring and in particular to a weakening in the sensor ring. As the sensor ring is fitted tightly to the inner or outer ring, the displacement can be measured by the sensor. The measurement device may be manufactured separate from the bearing itself, allowing to use the measurement device on a bearing which requires a measurement of radial and/or axial force on the bearing.

In an embodiment of the present invention the at least one weakening is formed by a slot in the sensor ring. The weakening may also be a recession in the sensor ring or a flattening of the sensor ring. A slot is preferred as this allows the displacement of the bearing inner or outer ring to be measured directly.

The dimension of the slot in a circumferential direction is substantially equal to a distance between two of the plurality of roller elements of the bearing. This will enable to measure a maximum possible displacement, as a wider slot may result in a permanent displacement as a result of more rolling elements being in the weakening area at the same time. A smaller weakening dimension will result in less displacement, and thus less response of the measuring device.

In a preferred embodiment of the present invention, the measuring device further comprises filter means for filtering a signal form the at least one sensor, the filter means being arranged to pass signal components within a predetermined frequency interval. This embodiment will allow to distinguish signals from the sensor caused by various phenomena. One phenomenon is the frequency of the rolling elements in the bearing which pass the weakening during operation. The frequency of this signal depends on the bearing size and the number of rolling elements, and is usually between five and ten times the rotating speed (rpm) of the bearing. Another phenomenon is caused by the unroundness of the bearing inner or outer ring when the bearing is axially preloaded. This phenomenon causes a relatively low frequency in the detected signal, approximately two to three times the rotating speed of the bearing. Applying a filter characteristic which corresponds to the mentioned frequency will result in an output signal in which that frequency is dominant while other signal frequency components are suppressed.

In a further embodiment the sensor ring is pretensioned around the inner ring or outer ring of the bearing. Varying the contact force between sensor ring and the inner ring or outer ring will result in a different response of the measurement device, which may be advantageous in certain circumstances.

To enable differential load sensing for a radial and an axial load on a bearing, the sensor ring comprises two weakenings, a sensor being positioned in each of the weakenings. Preferably, the two weakenings are positioned opposite one another on the sensor ring. For pure radial forces, an increase will be measured in one sensor, while a decrease will be measured in the other sensor. An axial force, however, will be transformed to a radial force, depending on the type of bearing, which is equally distributed in all directions, and will thus be sensed as an increase in deflection at both sensors. In the care of a pure radial load on the bearing, also the direction of the force can be derived using this embodiment.

With a further embodiment, in which the sensor ring comprises at least three weakenings, each having a sensor, the sensors being positioned in a surface which is perpendicular to an axis of rotation of the bearing, it is possible to determine the direction of the force on the bearing, even in the case of a bearing with an axial load and/or a preload.

In a further embodiment, the at least one sensor is of one of the following types: piezo-electric sensor, pressure sensor, capacitive sensor, inductive sensor, optical sensor. These types of measurement elements allow easy assembly of the measurement device according to the present invention.

In a specific embodiment of the present invention, the sensor ring is formed by a u-shaped annular member having an outer member and an inner member forming the legs of the u-shaped annular member, the outer member and inner member are extending substantially parallel to a central axis of the sensor ring, and a circular gap is being formed between the outer member and the inner member. This embodiment provides a measurement device for measuring axial and/or radial load on a bearing which measures the load indirectly, i.e. by measuring a deflection of the gap in the sensor ring.

It will be apparent to the person skilled in the art that the sensor ring may form an integral part of the inner ring or outer ring of the bearing.

A further aspect of the present invention relates to a measurement system for differential load sensing of axial and radial load on a bearing, the measurement system comprising a processing unit, a memory unit connected to the processor unit, and a measurement device according to the present invention connected to the processing unit, the processing unit being arranged for calculating the axial and radial load on the bearing, the radial load being derived from the difference value of measurement signals from the at least two sensors and the axial load being derived from a change of the average value of the measurement signals from the at least two sensors. By processing the signals form the sensors in this way, an accurate measurement of both axial and radial force is provided.

In a preferred embodiment, the processing unit of the measurement system is arranged to derive the axial load on the bearing using a bearing model, the bearing model describing the relationship between the axial load on the bearing and the resulting radial load on the bearing. The model is preferably stored in the memory means of the measurement system and accurately models how am axial force on a bearing is transformed into a radial force in all directions perpendicular to the sensor ring axis. This primarily, depends on the type of bearing used (roller bearing, tapered roller bearing, ball bearing, etc.) and the dimensions of the bearing.

The present invention will now be described in more detail using a preferred embodiment with reference to the accompanying drawings, in which FIG. 1 shows a top view of a measurement device and a bearing according to a first embodiment of the present invention;

FIG. 4 shows a top view of a measurement device according to a second embodiment of the present invention;

FIG. 5 shows a sectional side view of the measurement device of FIG. 4 along the lines V—V;

FIG. 6 shows a sectional side view of a measurement device of FIG. 4 attached to a roller bearing.

In known load measuring systems for measuring axial and/or radial load on a bearing, the load is measured directly on the bearing components, e.g. by using strain gauges in a recession of the bearing outer ring. The great temperature dependency of such sensors and the required electronics to detect resistance changes in the strain gauged is a known disadvantage of such systems.

Figure 1:
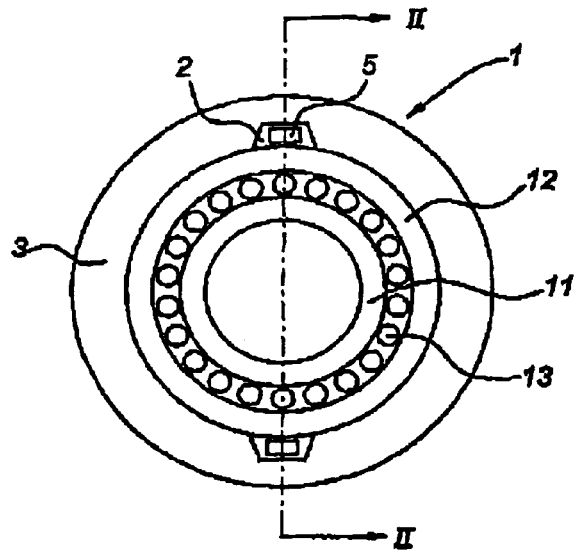
Figure 2:
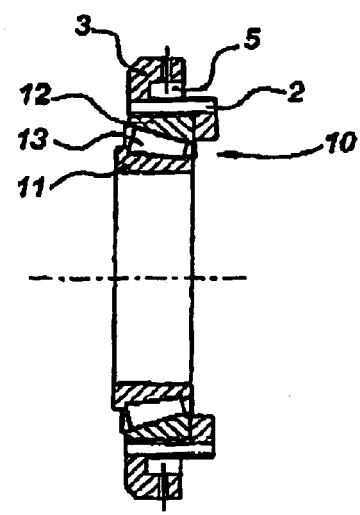
FIG. 2 shows a sectional side view of the measurement device of FIG. 1 along the lines II—II.

The present invention provides an improved system for measuring axial and radial loads on a bearing. FIG. 1 shows a top view of an assembly of a measurement device 1 and a bearing 10, such as a ball bearing comprising an inner ring 11, outer ring 12 and a plurality of rolling elements 13. FIG. 2 shows a cross sectional view of the assembly of FIG. 1 along the line II—II. The bearing comprises a plurality of rolling elements 13 between an outer ring 12 and an inner ring 11. The measurement device 1 comprises a sensor ring 3, in which weakenings 2 are provided. The weakening are preferably slots 2 formed by a partial recession or even a through hole in the sensor ring 3. The weakening 2 may also be a recession in the sensor ring 3 or a flattening of the sensor ring 3. A slot is preferred as this allows the displacement of the bearing inner or outer ring 11, 12 to be measured directly. In each of the weakenings 2, a sensor 5 is positioned, for measuring the outward deflection, which can be used to determine the actual load on the bearing 10. The sensor 5 may be a displacement sensor actually measuring the deflection, or e.g. a load sensor, which directly measures a load.

Figure 3A:
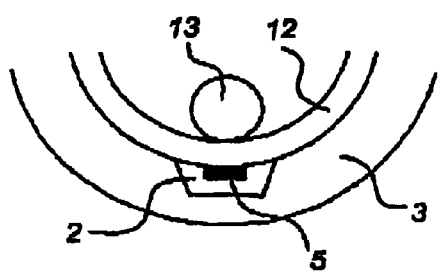
FIGS. 3a and 3b show a part of the measurement device and bearing of FIG. 1, in two positions of the rolling elements with respect to the sensor.
Figure 3B:
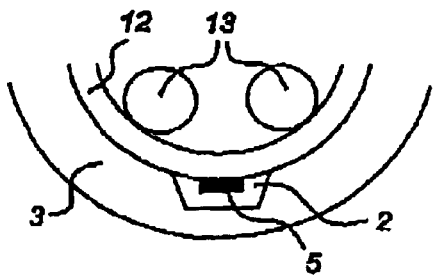

The weakening 2 of the sensor ring 3 allows the outer ring 12 of the bearing to deflect outwards when a rolling element 13 passes the weakening 2. FIG. 3 shows a part of the assembly of the measurement device 1 and the bearing 11, 12, 13, in which FIG. 3a shows a situation where a rolling element 13 is exactly above a sensor 5, and FIG. 3b shows a situation where two rolling elements 13 are positioned at equal distance from the sensor 5.

As will be apparent to the person skilled in the art the sensor ring 3 with the weakenings 2 may form an integral part of the inner ring 11, or outer ring 12 of the bearing 10.

A radial load applied on a bearing 10 is distributed over a number of the plurality of rolling elements 13 of the bearing 10. Depending on the bearing type, and amount of load, the radial load is distributed over a few to substantially half of the plurality of the rolling elements 13. When a bearing 10 is rotating in operation, the passing rolling elements 13 cause a local compression of the raceway of the inner or outer bearing ring 11, 12, resulting in a displacement. This displacement is effectively transmitted to the sensor ring 3 and in particular in the area of the weakening 2 in the sensor ring 3. As the sensor ring 3 is fitted tightly to the inner or outer ring 11, 12, the displacement can be measured by the sensor 5. The measurement device 1 may be manufactured separate from the bearing 10 itself, allowing to use the measurement device 1 on a bearing 10 which requires a measurement of radial and/or axial forces an the bearing 10.

The dimension of the slot 2 in a circumferential direction is substantially equal to a distance between two of the plurality of roller elements 13 of the bearing 10. This will enable to measure a maximum possible displacement, as a wider slot will result in a permanent displacement as a result of more rolling elements 13 being in the weakening area at the same time. A smaller weakening dimension will result in less displacement, and thus less response of the measuring device 1

It is also possible to vary the contact force between sensor ring 3 and the inner ring or outer ring 11, 12. This will result in a different response of the measurement device 1, which may be advantageous in certain circumstances.

FIG. 4 shows a top view of a measurement device 1 according to a further embodiment of the present invention. FIG. 5 shows a cross sectional view of the measurement device 1 of FIG. 4 along the lines V—V. The measurement device 1 comprises a u-shaped annular member 3 having an outer member 6 and an inner member 7. The inner member 7 and outer member 6 form the two legs of the u-shaped annular member 3, and extend in a direction substantially parallel to the central axis of the sensor ring 1. The outer member 6 and inner member 7 form a circular gap 2 between them. In an embodiment according to the present invention, the sensor ring may be provided with an inner ring 4, protruding inward from the u-shaped annular member to accommodate a bearing outer ring (see description of FIG. 6 below).

For measuring purposes, a number of sensors 5 are provided in the gap 2. The sensors 5 are provided to measure the deflection of the gap 2, and may be one type of a group of sensor types comprising piezo-electric element, pressure sensor, capacitive sensor, inductive sensor, optical sensor. Each different kind of sensor type has its specific advantages for various applications.

FIG. 6 shows an assembly of a measurement element according to the present invention and a roller bearing 10. The roller 10 comprises an inner ring 10, a plurality of rollers 13 and an outer ring 12. The sensor ring 1 according to the present invention can be mounted on the outside of the outer bearing ring 12 as shown in the drawing. The inner member 7 of the sensor ring 1 is mounted flush with the bearing outer ring 12, such that loads on the bearing 10 are transmitted to the sensor ring 1. The loads on the sensor ring 1 cause a deformation of the gap 2 due to elastic effects of the u-shaped annular ring 3. Alternatively, the sensor ring 1 may be mounted on the inside of the bearing inner ring 11, in a manner that the outer surface of the sensor ring 1 is flush with the bearing inner ring 11 in order to transmit the loads on the bearing effectively.

In order to be able to measure both radial and axial loads on the bearing 10, at least two sensors 5 should be provided in the gap 2 of the sensor ring 1. With two sensors 5 it can be determined whether the deformation of the gap 2 is caused by radial or axial loads or a combination of both. For a pure radial force, an increase in the deflection of the gap 2 will be measured at one set point while a decreased deflection is measured at the other (opposite) sensing point. An axial force on the bearing 10 will be transformed into a radial force which is equally distributed in all radial directions, and will therefore result in an increased deflection of the gap 2 around its entire perimeter and thus an equal increase in signal from all sensors 5. The difference value of the signals of the sensors 5 allows derivation of the radial load, while a change in the average value of the signals of the sensors 5 allows derivation of the axial load.

With two sensors 5, the radial load on the bearing 10 can be measured in a single direction, the direction being along the interconnecting line between the two sensors 5. By using three sensors, the radial load on the bearing 10 can be determined in all directions along the surface formed by the three sensors 5, i.e. in the embodiment shown perpendicular to the central axis.

Figure 7:
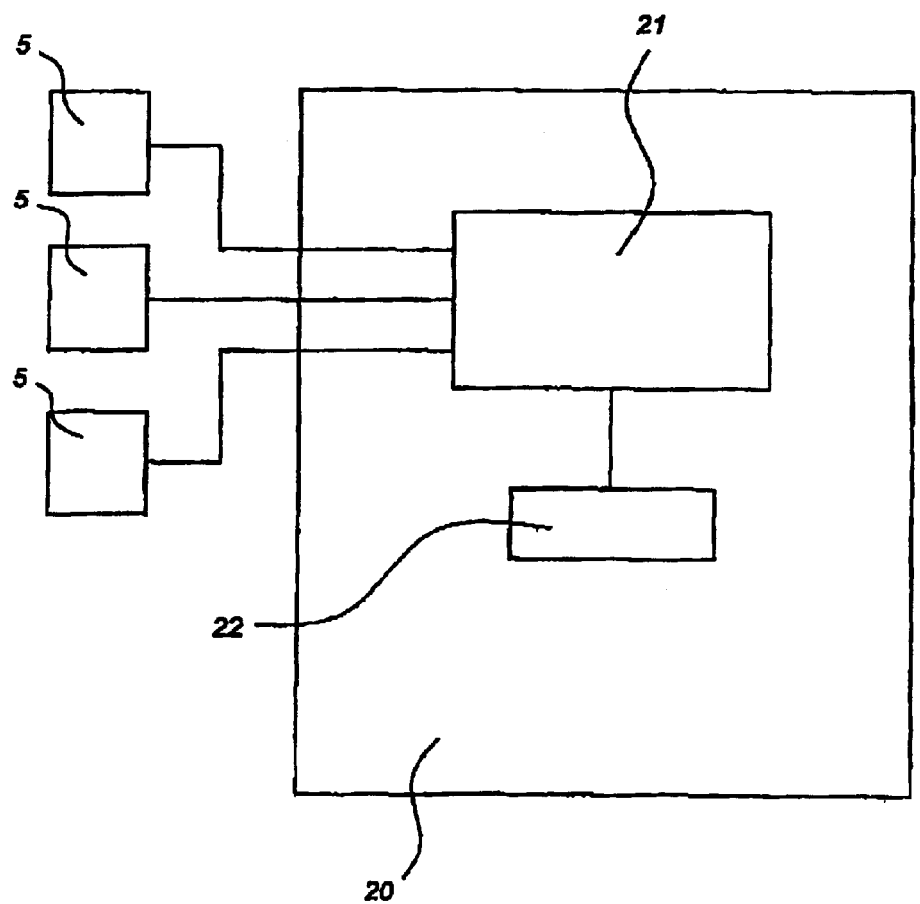
FIG. 7 shows a schematic diagram of a measurement system according to the present invention, using the measurement device of FIG. 4.

FIG. 7 shows a schematic diagram of a measurement system 20 according to the present invention. The measurement system 20 comprises a processor 21 and memory means 22 connected to the processor 21. The processor 20 may be a microprocessor or a dedicated signal processor. The sensors 5 provide their measurement signals to the processor 21. Depending on the type of sensor 5 used, the sensor signal may need additional electronics for signal conditioning or pre-processing.

In a preferred embodiment, the processor 21 is arranged for calculating the axial and radial load on the bearing from the signals received from the sensors 5. The radial load on the bearing 10 is derived from the difference value of the measurement signals and the axial load is being derived from a change of the average value of the measurement signals. When three sensors 5 are used, the processor 21 is also arranged to derive the direction of the radial load on the bearing 10.

As an example, the processor 21 is arranged to derive the axial load on the bearing 10 using a bearing model which may be stored in the memory means 22. The bearing model describes the relationship between the axial load on the bearing and the resulting radial load on the bearing for a specific type of bearing. Dependent on the type of bearing, such as a roller bearing, a tapered roller bearing, a ball bearing, etc., an axial load on the bearing 10 is transformed into a load in a type specific manner.

Also, the processor 21 may be arranged to implement a filter for the signals received from the sensors 5. The filter is arranged to pass signal components within a predetermined frequency interval. This embodiment will allow to distinguish signals from the sensor 5 caused by various phenomena. One phenomena is the frequency of the rolling elements 13 in the bearing 10 which pass the weakening 2 during operation. The frequency of this signal depends on the bearing size and the number of rolling elements 13, and is usually between five and ten times the rotating speed (rpm) of the bearing 10. Another phenomena is caused by to unroundness of the bearing inner or outer ring 11, 12 when the bearing is axially preloaded. This phenomena causes a relatively low frequency in the detected signal approximately two to three times the rotating speed of the bearing 10. Applying a filter characteristic which corresponds to the mentioned frequency ranges will result in an output signal in which that frequency is dominant while other signal frequency components are suppressed.

What is claimed is:

1. Measurement system for differential load sensing of axial and radial load on a bearing (10),
   the measurement system (20) comprising a processing unit (21), a memory unit (22) connected to the processor unit (21), and a measurement device (1) connected to the processing unit (21),
   the measurement device (1) comprising an inner ring (11), an outer ring (12) and a plurality of rolling elements (13) between the inner and outer ring,
   characterised in that the measurement device (1) further comprises a sensor ring (3) which may be positioned adjacent to and in close contact with the inner ring (11) or outer ring (12) of the bearing (10),
   the sensor ring (3) having at least two weakenings (2) at its circumference and at least one respective sensor (5) being positioned in each of the at least two weakenings (2),
   the processing unit (21) being arranged for calculating the axial and radial load on the bearing (10), the radial load being derived from the difference value of measurement signals from the at least two sensors (5) and the axial load being derived from a change of the average value of the measurement signals from the at least two sensors (5).

2. Measurement system according to claim 1, in which the processing unit (21) is arranged to derive the axial load on the bearing (10) using a bearing model, the bearing model describing the relationship between the axial load on the bearing (10) and the resulting radial load on the bearing (10).

3. Measurement system according to claim 1, in which each of the at least two weakenings (2) is formed by a respective slot in the sensor ring (3).

4. Measurement system according to claim 3, in which a dimension of the slots (2) in a circumferential direction is substantially equal to a distance between two of the plurality of roller elements (13) of the bearing (10).

5. Measurement system according to claim 1, further comprising filter means (21) for filtering signals from the at least two sensors (5), the filter means (21) being arranged to pass signal components within a predetermined frequency interval.

6. Measurement system according to claim 1, in which the sensor ring (3) is pretensioned around the inner ring (11) or outer ring (12) of the bearing (10).

7. Measurement system according to claim 1, in which the sensor ring (3) comprises at least three weakenings (2), each having at least one sensor (5), the sensors (5) being positioned in a surface that is perpendicular to an axis of rotation of the bearing (10).

8. Measurement system according to claim 1, in which each of the at least two sensors (5) is of one of the following types: piezo-electric sensor, pressure sensor, capacitive sensor, inductive sensor, and optical sensor.

9. Measurement system according to claim 1, in which the sensor ring (3) is formed by a u-shaped annular member having an outer member (6) and an inner member (7) forming the legs of the u-shaped annular member (4), the outer member and inner member (6,7) extending substantially parallel to a central axis of the sensor ring (3), a circular gap (2) being formed between the outer member and inner member (6,7).

* * * * *